US010552596B2

(12) United States Patent
Wang et al.

(10) Patent No.: US 10,552,596 B2
(45) Date of Patent: Feb. 4, 2020

(54) BIOMETRIC AUTHENTICATION

(71) Applicant: International Business Machines Corporation, Armonk, NY (US)

(72) Inventors: Jian Jun Wang, Xi'an (CN); Chao Xing Zhou, Shanghai (CN); Shuai Cao, Shanghai (CN); Yiping Qu, Shanghai (CN); Yue Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 15/848,155

(22) Filed: Dec. 20, 2017

(65) Prior Publication Data

US 2019/0188364 A1 Jun. 20, 2019

(51) Int. Cl.
| | | |
|---|---|---|
| *G06F 21/32* | (2013.01) | |
| *G06K 9/00* | (2006.01) | |
| *G06T 7/40* | (2017.01) | |
| *G06F 3/041* | (2006.01) | |

(52) U.S. Cl.
CPC ............ *G06F 21/32* (2013.01); *G06F 3/0414* (2013.01); *G06K 9/001* (2013.01); *G06K 9/00013* (2013.01); *G06T 7/40* (2013.01)

(58) Field of Classification Search
CPC ....... G06F 21/32; G06F 3/0414; G06K 9/001; G06K 9/00013; G06T 7/40
See application file for complete search history.

(56) References Cited

U.S. PATENT DOCUMENTS

| | | | |
|---|---|---|---|
| 7,133,541 B2 | 11/2006 | Haselsteiner et al. | |
| 8,310,372 B2* | 11/2012 | Kukula | G06K 9/00006 340/5.53 |
| 8,509,494 B2 | 8/2013 | Bruekers et al. | |
| 9,646,193 B2* | 5/2017 | Setterberg | G06F 3/044 |
| 9,911,026 B2* | 3/2018 | Andesson | G06F 21/32 |
| 10,192,091 B2* | 1/2019 | Chung | G06K 9/0002 |
| 2008/0166028 A1* | 7/2008 | Turek | G06K 9/0002 382/124 |
| 2010/0027854 A1* | 2/2010 | Chatterjee | G06F 3/016 382/124 |
| 2010/0066697 A1* | 3/2010 | Jacomet | G06F 3/0414 345/173 |
| 2015/0213244 A1 | 7/2015 | Lymberopoulos et al. | |
| 2016/0078268 A1* | 3/2016 | Mankowski | G06F 21/32 382/124 |

OTHER PUBLICATIONS

K. Sindhu and L. Latha, "Person Identification using Multiple Fingerprint Matching," International Journal of Computer Applications, Machine Learning-Challenges and Opportunities Ahead, MLCONF-2014, 4 pages.
Brent Sammons, Breakthrough 3D fingerprint authentication with Snapdragon Sense ID, OnQ Blog, Mar. 2, 2015, 7 pages.

* cited by examiner

*Primary Examiner* — Utpal D Shah
(74) *Attorney, Agent, or Firm* — Patterson + Sheridan, LLP

(57) ABSTRACT

The disclosure provides for biometric authentication. Texture data of an object associated with a user is acquired. The texture data comprises one or more texture images of the object and one or more corresponding pressure indicators indicating pressures under which the respective texture images are collected. The acquired texture data is then verified to authenticate the user.

20 Claims, 5 Drawing Sheets

BIOMETRIC AUTHENTICATION

BACKGROUND

The present invention relates to identity authentication, and more specifically, to authentication of an individual via biometrics such as fingerprints.

Biometrics refers to metrics related to human characteristics. Biometric authentication such as fingerprints authentication is now widely used in devices, such as smart phones, laptops, access badge devices or attendance management equipment, as a form of identification and access control. Typically, a biometric library is established by acquiring biometric data of body parts such as fingers, toes, palms or feet of users in advance. When an identity of a user needs to be verified, the user's biometric data is collected via a biometric reader and is verified against the biometric library to find if there is a match between the user's biometric data and the biometric data in the library. If a match exists, the user is authenticated successfully. Otherwise, the authentication fails and the user is denied.

SUMMARY

Disclosed herein are embodiments of a method, system and computer program product for biometric authentication.

According to one embodiment of the present invention, there is provided a computer-implemented method. The method comprises acquiring texture data of an object associated with a user. The texture data comprises one or more texture images of the object and one or more corresponding pressure indicators indicating pressures under which the respective texture images are collected. The method further comprises verifying the acquired texture data to authenticate the user.

According to another embodiment of the present invention, there is provided a computer system. The computer system comprises a processor and a computer-readable memory coupled to the processor. The memory comprises instructions that when executed by the processor perform actions of acquiring texture data of an object associated with a user and verifying the acquired texture data to authenticate the user. The texture data comprises one or more texture images of the object and one or more corresponding pressure indicators indicating pressures under which the respective texture images are collected.

According to further embodiment of the present invention, there is provided a computer program product. The computer program product comprises a computer readable storage medium having program instructions embodied therewith. The program instructions are executable by a processor to cause the processor to acquire texture data of an object associated with a user and to verify the acquired texture data to authenticate the user. The texture data comprises one or more texture images of the object and one or more corresponding pressure indicators indicating pressures under which the respective texture images are collected.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
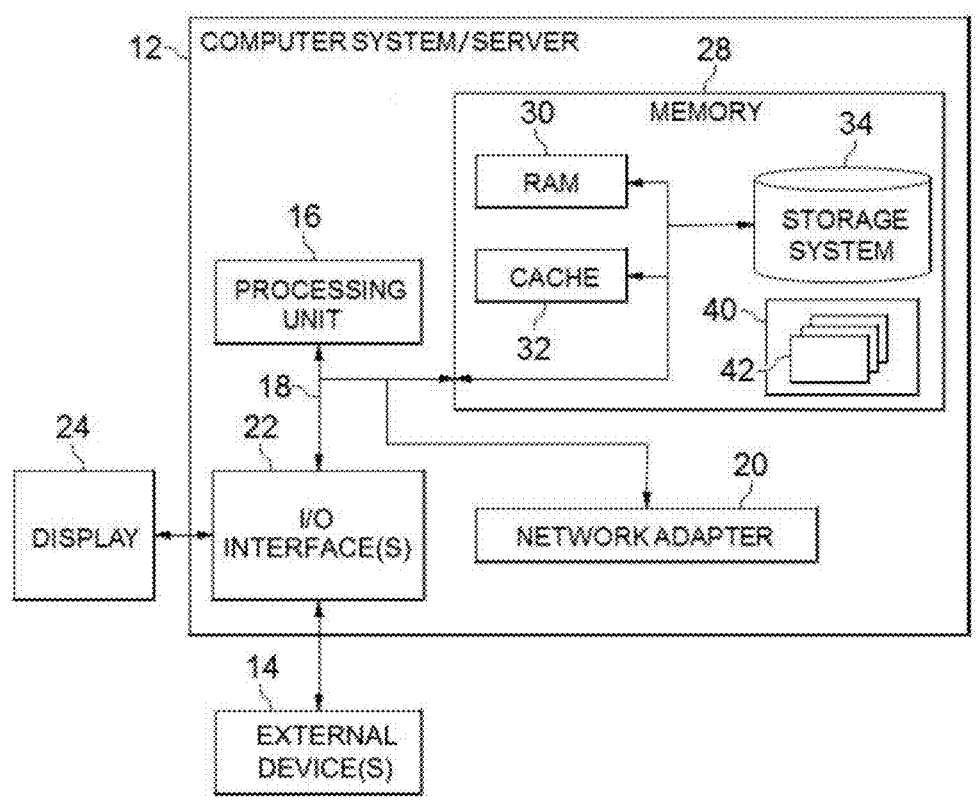
FIG. 1 shows an exemplary computer system which is applicable to implement the embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As a typical kind of biometric authentication, fingerprint authentication (also referred to as fingerprint recognition) verifies identify of a user by checking the fingerprints of the user. Current fingerprint authentication is usually implemented by capturing one two-dimensional image of the user's fingerprint and searching a fingerprint library comprising a number of fingerprint images already captured to find if there is a match between the captured image and any image in the library. The captured image of the fingerprint may change with the way a person put his/her finger on the fingerprint reader. For example, with different pressures applied by the person on the fingerprint reader, the captured images of the fingerprint are different. However, it is hard to ensure that the fingerprint image to be verified is captured in the same way as the fingerprint image of the same finger in the library. Therefore, a high tolerance has to be allowed in the matching process. This limits the accuracy of the current fingerprint authentication mechanism.

Moreover, with the development of various new materials, it is easy to fabricate a user's fingerprint, such as by using materials that have similar properties with human skin and soft tissues. Current fingerprint authentication mechanism cannot distinguish between genuine fingerprints from fake ones as it only carries out a single and static image match as described above.

As mobile devices are increasingly used for financial and business transactions, the security risk exposed by the current fingerprint authentication mechanism is rising, often resulting in significant loss of users.

Other biometric authentications such as palm print authentication or foot print authentication also have the above challenges.

Therefore, there is a need for a new biometric authentication mechanism with improved accuracy and/or security.

In the following description, fingerprint authentication may be described as an example of biometric authentication. However, it should be noted that the present invention is also applicable to other biometric authentications, such as palm print authentication, foot print authentication, etc., and the processing for the other biometric authentications is similar to the fingerprint authentication.

Figure 2:
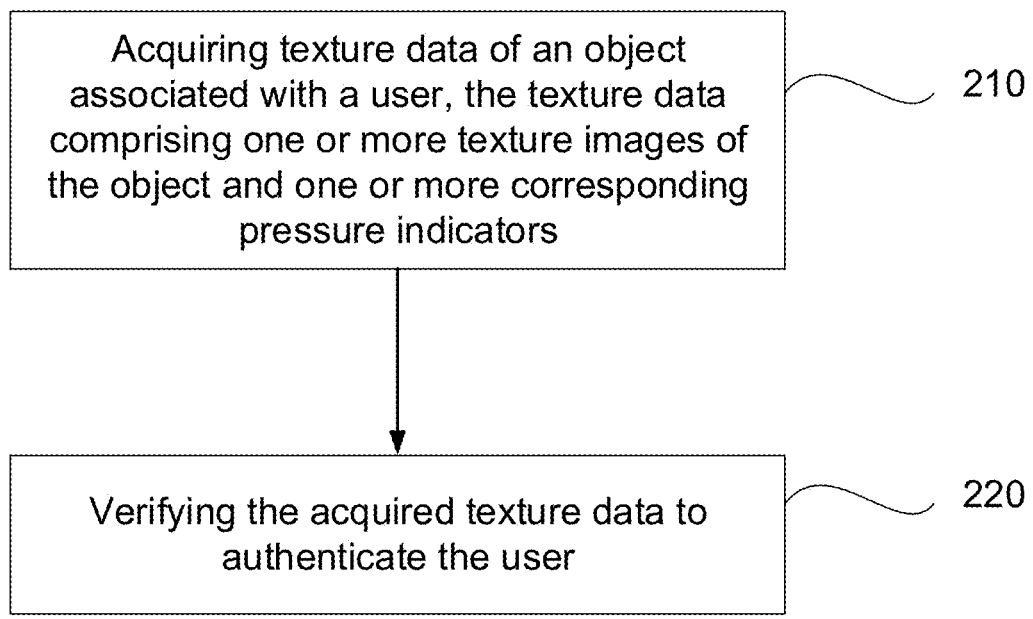
FIG. 2 shows an exemplary method of biometric authentication in accordance with an embodiment of the present invention.

With reference now to FIG. 2, an exemplary method of biometric authentication is shown in accordance with an embodiment of the present invention.

As shown in block 210, texture data of an object associated with a user is acquired. The texture data may comprise one or more texture images of the object (e.g., collected by a biometric reader) and one or more corresponding pressure indicators indicating pressures under which the respective texture images are collected. The object may be a genuine body part of an individual or a fake one, and accordingly, the texture data may be genuine biometric data or fake biometric data. For fingerprint authentication, the object may be a finger of human or any bionic object that simulates human fingerprint, such as a fake finger made of silicone or a fingerprint cap worn on a human finger, and the texture data may be genuine or fake fingerprint data. For other biometric authentications, the object may be other genuine or fake body part, such as genuine or fake palm, toe or foot, and the texture data may be genuine or fake biometric data of the body part, e.g., palm print, toe print, or foot print. As will be explained later, the present invention is able to distinguish genuine biometrics from fake ones.

Take fingerprint authentication as an example.

A fingerprint reader or fingerprint sensor is an electronic device used to capture an image of fingerprints. Technologies used by the fingerprint reader to capture fingerprint images include but not limited to, optical, capacitive, Radio Frequency (RF), thermal, piezoresistive, ultrasonic, piezoelectric, Micro Electro Mechanical System (MEMS), etc. The image may be kept in a raw format, or may be processed to extract features from it. In fingerprint registration process, the image and/or the features extracted from it can be stored in a library as a biometric template and used for later matching. In fingerprint authentication process, the image and/or the features extracted from it may be compared with the biometric templates stored in the library to find if there is a match.

Typically, a fingerprint image shows a distribution of friction ridges of the object when it is put on the fingerprint reader. Because of the elasticity of the object, different fingerprint ridge deformations may be produced under different pressures imposed by the object on a contact surface of the fingerprint reader. Different materials may have different elastic modulus. Accordingly, for objects made of different materials, the amount of fingerprint ridge deformation may be different even with the same amount of pressure. As a simple case, the fingerprint ridge deformation may have a linear or approximately linear relationship with the pressure. Then the slope of fingerprint ridge deformation versus pressure would be associated with the elastic modulus of the object. As such, different materials may have different slopes of fingerprint ridge deformation versus pressure. It should be noted that the fingerprint ridge deformation may alternatively have non-linear relationship with the pressure. But still, the relationship between deformation and pressure is distinct for different materials.

Therefore, by comparing the captured fingerprint image(s) and corresponding pressure(s) with previously registered data, genuine fingerprints of human fingers can be distinguished from fake ones due to their different elastic modulus. Moreover, with the pressure information, the tolerance in fingerprint verification may be decreased such that the false positive rate can be reduced and the accuracy of fingerprint authentication can be improved.

Thus it may be valuable to collect information about the pressures under which fingerprint images are collected. The information about the pressures may be referred to as pressure indicators. According to an embodiment, the pressure indicators may be the pressures per se imposed by the finger on the fingerprint reader. According to another embodiment, the pressure indicators may be contact areas of the finger on the fingerprint reader. The pressure may be acquired via a force sensor accompanied or integrated with the fingerprint reader. The contact area may be determined from the occupied area of the fingerprint in the image captured by the fingerprint reader. Generally, as the pressure increases, the finger is extruded and the contact area of the object on the fingerprint reader becomes larger. That is, there is a positive correlation between the pressure and the contact area.

Figure 3:
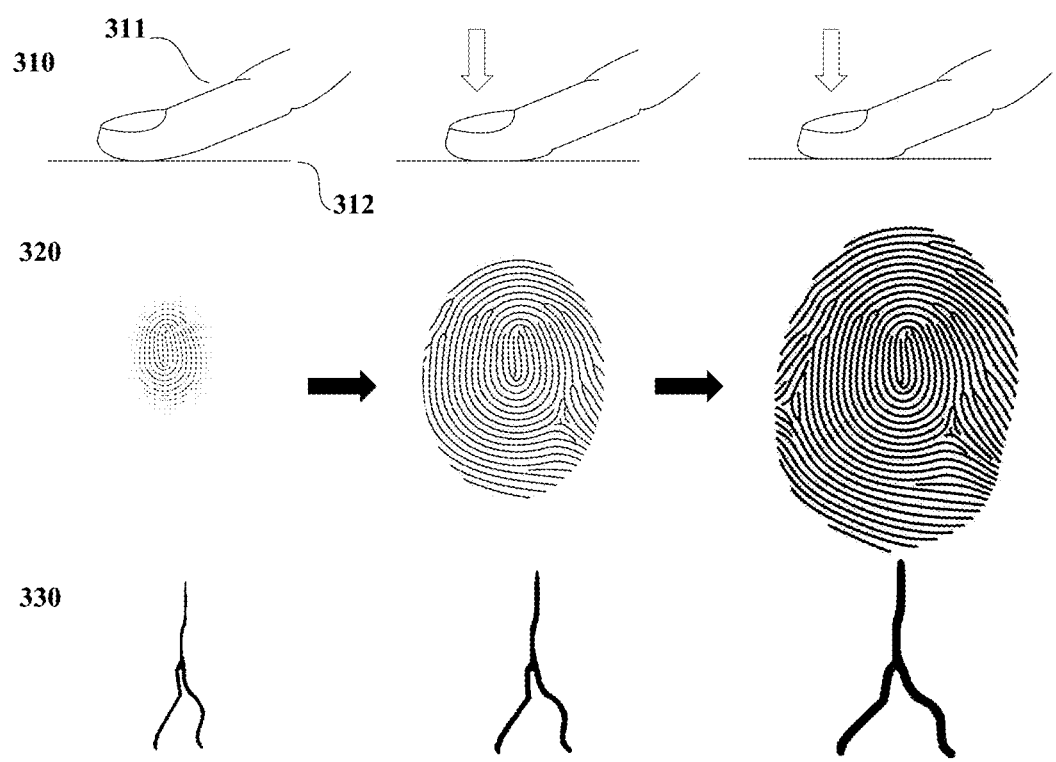
FIG. 3 shows exemplary different contact areas and different angles of bifurcation under different pressures imposed by a finger of a user.

As an example, FIG. 3 shows different contact areas under different pressures imposed by a finger of a user. As shown from left to right in row 310 of FIG. 3, as the pressure imposed by finger 311 on contact surface 312 of a fingerprint reader (not shown) increases, the deformation of the finger becomes larger and the contact area increases. Row 320 shows the corresponding fingerprint images captured by the fingerprint reader under the different pressures of row 310. Contact areas may be shown as the occupied areas of fingerprints in the images of row 320. It can be seen that the contact area becomes larger as the pressure increases. In the following descriptions, pressure per se may be used as the pressure indicator, but it should be noted that contact area may be alternatively used to indicate the pressure.

FIG. 3 further shows exemplary ridge deformations under different pressures imposed by the finger. The ridge deformation may become larger along with the increase of the pressure, as described above. For example, it can be found from row 320 that the width of ridges becomes larger as the pressure increases. As another example, row 330 shows that the angle of a bifurcation in a fingerprint, which is another exemplary ridge characteristic, may become larger as the pressure increases.

According to an embodiment, the biometric data are collected at a sampling frequency from the time when the object touches the biometric reader to the time when the object leaves the biometric reader. The sampling frequency may be sufficiently high so that multiple pairs of texture images and corresponding pressure indicators are acquired. Alternatively, only one pair of texture image and corresponding pressure indicator may be acquired.

Referring back to FIG. 2, at block 220, the acquired texture data is verified to authenticate the user. If the acquired texture data passes the verification, the user is authenticated to perform further operations such as entering an operation system of a computer, accessing a location, launching an application in a mobile device, etc.

According to an embodiment, the verification at block 220 may comprise determining whether there is a match between the one or more texture images of the object acquired at block 210 and one or more biometric images stored in a library and corresponding to the one or more pressure indicators acquired at block 210, and in response to determining there is the match, authenticating the user to be valid. Here, the biometric images stored in the library refer to the genuine biometric images previously collected and stored for future authentication. Moreover, the one or more biometric images corresponding to the one or more pressure indicators acquired at block 210 means that, the one or more biometric images are previously collected under the same or similar pressures as the one or more texture images acquired at block 210. In a further example, in response to determining there is no match, the user is authenticated to be invalid, and/or a notification information can be shown or sent to the user. More details regarding the matching will be discussed later.

According to an embodiment, the one or more texture images may be determined according to the one or more pressure indicators and a biometric data model. The biometric data model may indicate a relationship between the biometric images stored in the library and pressure indicators indicating pressures under which the biometric images stored in the library are collected. In an example, the biometric data model can be built before the verification. In another example, the biometric data model can be imported to the library from a preset biometric data model source. In the building of the biometric data model, one or more biometric images under corresponding pressures imposed by a body part on a biometric reader may be acquired, and the relationship between the one or more biometric images and pressure indicators indicating the corresponding pressures may be stored in the library. This process is also called as biometric registration with the library. The biometric data model is used as a biometric template for later matching. Here, the step of acquiring biometric images in building the biometric data model may be similar to the acquiring step 210 described with reference to FIG. 2. Similarly, the pressure indicators may also be pressures or contact areas. In the following description, pressure per se may be used as the pressure indicator as an example.

To improve accuracy of the biometric data model, it is preferred to acquire a number of pairs of biometric images and corresponding pressures during the biometric registration. Relatively, less biometric data can be acquired in the acquiring step 210. Accordingly, the biometric reader may sample at a higher frequency in the registration process (i.e., in building the biometric data model) than the authentication process. Take fingerprint data model as an example. In an embodiment, a user is required to press a finger on the fingerprint reader from the lightest to the hardest pressure. With the change of the pressure, the contact area of the finger on the fingerprint reader changes, and the fingerprint image also changes. The fingerprint reader collects pairs of the pressures or contact areas and the corresponding fingerprint images to build a fingerprint data model for that finger. The biometric data model with the pressure information may be referred to as a proximate 3D model, in which the pressure information may be regarded as the third dimension in addition to the 2D biometric image.

The relationship between the biometric images and the corresponding pressures may be stored by simply storing the raw data of biometric images and the corresponding pressures. Alternatively, the raw data of biometric images may be processed to extract and store data of ridge characteristics, thereby alleviating the burden of storing large volume of data. According to an embodiment, the data of ridge characteristics and the corresponding pressures may be further processed to obtain a fitted curve between them, and the fitted curve may be stored to indicate the relationship between the biometric images (or more specifically, the ridge characteristics) and the corresponding pressures.

According to an embodiment, the one or more texture images of the object may be compared with the one or more stored biometric images corresponding to the one or more pressure indicators, and in response to a similarity between them being larger than a threshold, it is determined there is a match. For example, each of the acquired texture images of the object may be compared with a stored biometric image in the library under the same or similar pressure to get the similarity between them. If each pair of two images for comparison under the same or similar pressure are similar enough, e.g., the similarity being larger than a threshold, it may be considered that a match exists. Alternatively, a total similarity of all the pairs of images for comparison may be calculated, e.g., by averaging or weighted-averaging the similarities of all the pairs, and then be used to determine the existence of the match. In a further example, if the similarity does not comply a predefined criterion, it is determined there is no match.

The comparison of the two images may be performed using conventional biometric verification techniques. However, the tolerance or threshold for the match can be significantly stricter than the conventional methods since the comparison is made between two images under the same or similar pressure. Alternatively or additionally, the comparison may be performed by quantitatively comparing one or more ridge characteristics of the acquired texture images and the stored biometric images, as described in more detail below.

Figure 4:
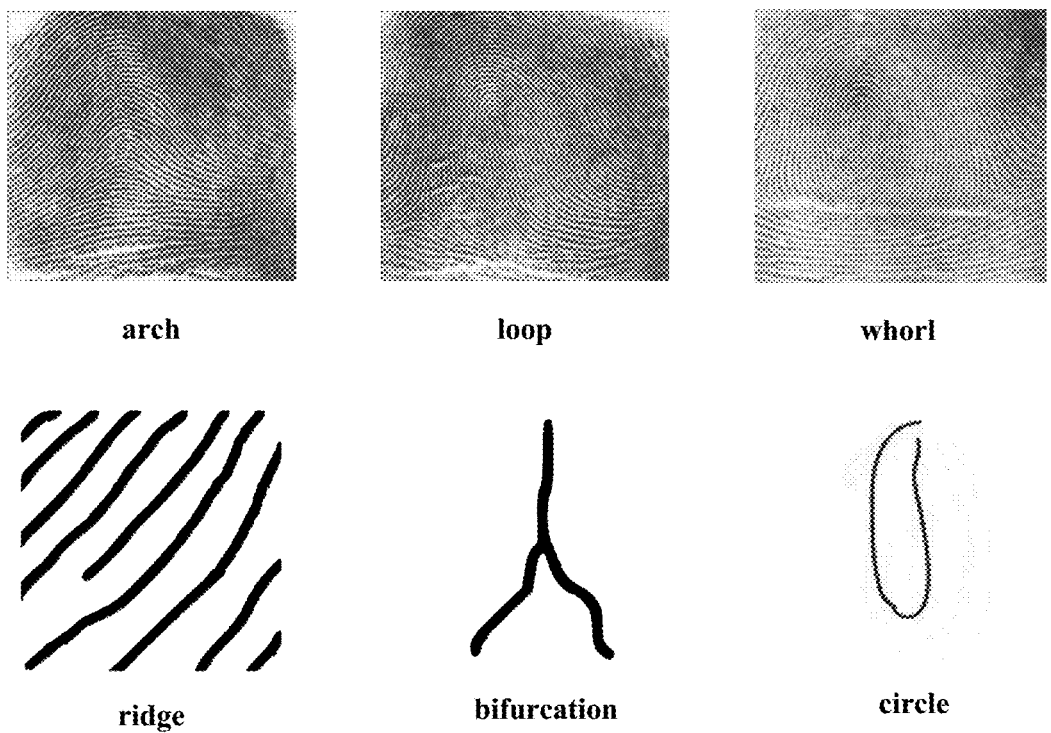
FIG. 4 shows exemplary different fingerprint patterns and ridge characteristics of fingerprints.

Still take fingerprint authentication as an example. The one or more ridge characteristics may comprise fingerprint patterns and fingerprint details. Finger patterns are aggregate characteristics of ridges. There are three basic fingerprint patterns: arch, loop and whorl. For arch, the ridges enter from one side of the finger, rise in the center forming an arc, and then exit the other side of the finger. For loop, the ridges enter from one side of a finger, form a curve, and then exit on that same side. For whorl, ridges form circularly around a central point on the finger. Fingerprint details include, but not limited to, width of ridges, length of ridges, perimeter of a circle, area of a circle, distance between two ridges, or angle of a bifurcation. A circle here is a ring of ridges which may not be closed and usually exists in the pattern of a whorl. A bifurcation is a point where a single ridge splits into two ridges. FIG. 4 shows the three basic fingerprint patterns of arc, loop and whorl and three common features of ridge, bifurcation and circle.

Several examples will be described below to illustrate the quantitative comparison. These examples will use the area of circle in the fingerprint as an example of the ridge characteristic for comparison. More specifically, the circles in a fingerprint may be identified, e.g., sequentially numbered from the center to the periphery of the fingerprint, and the area of each circle may be compared with the area of the corresponding circle of the stored fingerprint image in the fingerprint data model. Since the comparison is similar for each circle, the following examples will be described with respect to only one circle for simplicity. Moreover, it should be noted that other ridge characteristics may also be used for the quantitative comparison as an alternative or addition to the area of circle.

As a first example, considering the case where the stored fingerprint data model includes discrete data points of circle areas and corresponding pressures, the comparison for an acquired pressure P_a and corresponding circle area C_a of the object may comprise: determining a pressure range [P1, P2] in the fingerprint data model that P_a lies in, retrieving in the fingerprint data model for the circle areas C1 and C2 corresponding to P1 and P2 respectively, and checking if C_a lies in the range of [C1, C2]. The pressure range [P1, P2] may be chosen depending on the requirement of accuracy. Specifically, the range may be wide for a relatively low accuracy and narrow for a relatively high accuracy. Moreover, when more than one pair of circle area and pressure is compared, the percentage of successfully matching may be compared with a threshold to determine a final result of authentication. The threshold may also depend on the requirement of accuracy and/or security of particular applications.

Figure 5:
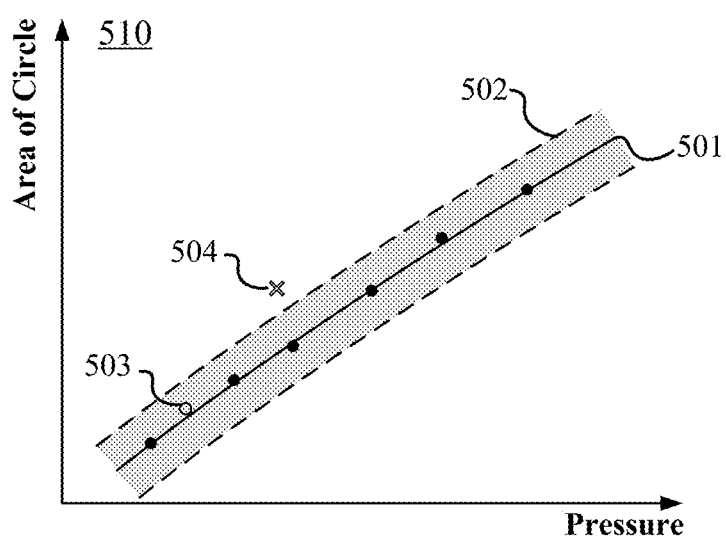
FIG. 5 shows an example of quantitatively comparing areas of a circle under different pressures with a fingerprint data model.

A second example may be the case where the fingerprint data model is in the form of a fitted curve of ridge characteristic (e.g., area of a circle in the fingerprint) versus pressure, as shown in FIG. 5. In FIG. 5, plot 510 shows a fitted curve 501 of area of a particular circle versus pressure. Curve 501 is shown as approximately linear, but this is not limited. FIG. 5 also shows a tolerance range 502 around curve 501 to indicate that sample points falling within the range are also acceptable. The tolerance range 502 may be set as needed, which also depends on the requirement of accuracy and/or security of particular applications.

When a registered user wants to verify, the user puts the finger on the fingerprint reader. Fingerprint images and the corresponding pressures are collected, and areas of a particular circle under different pressures are determined, which are shown as solid black points in plot 510. As shown in plot 510, although some solid black points may not strictly rest on the curve 501, they are still within the tolerance range 502, and can be verified correctly.

When a fake user, who uses a fingerprint that is made of silicone wants to verify, the user puts the fake fingerprint on the fingerprint reader. Fingerprint images and the corresponding pressures are collected, and areas of a particular circle under different pressures are determined, which are shown as hollow circles and crosses in 510. The fake fingerprint may imitate a genuine fingerprint under a particular pressure, e.g. under a low pressure. For example, hollow circle 503 indicates that the area of the circle and the corresponding pressure of the fake fingerprint satisfy the fitted curve 501 for the genuine fingerprint. However, the elastic modulus of silicone and human's skin are considerably different. For example, the elastic modulus of silicone may be 1.2 GPa and the elastic modulus of human's skin may be 28 Mpa~107 MPa. As a result, when the pressure changes, the silicone material cannot change the fake fingerprint in the way a human skin changes the genuine fingerprint, and the fake fingerprint can be distinguished from the genuine fingerprint. Hollow cross 504 indicates that another area of the circle with a different corresponding pressure of the fake fingerprint cannot satisfy the fitted curve 501 for the genuine fingerprint, and is even beyond the tolerance range 502. Accordingly, the acquired fingerprint data represented by hollow cross 504 fails to pass the verification. In this way, a fake user may be prevented from being authenticated.

A third example may be the case where the fingerprint data model is in the form of a fitted curve of ridge characteristic (e.g., area of a circle in the fingerprint) versus pressure and the acquired fingerprint data of the object to be verified is also processed to obtain a fitted curve of the ridge characteristic versus pressure. In this case, the two fitted curves may be compared with each other to determine whether there is a match.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an aspect of the present invention, there is provided a computer system. The computer system comprises a processor and a computer-readable memory coupled to the processor. The memory comprises instructions that when executed by the processor perform actions of: acquiring texture data of an object associated with a user and verifying the acquired texture data to authenticate the user. The texture data comprises one or more texture images of the object and one or more corresponding pressure indicators indicating pressures under which the respective texture images are collected.

According to an embodiment of the computer system, the verifying comprises: determining whether there is a match between the one or more texture images of the object and one or more biometric images stored in a library and corresponding to the one or more pressure indicators; and in response to determining there is the match, authenticating the user to be valid.

According to an embodiment of the computer system, the one or more biometric images are determined according to the one or more pressure indicators and a biometric data model.

According to an embodiment of the computer system, the biometric data model is built by: acquiring a plurality of biometric images under corresponding pressures imposed by a body part on a biometric reader; and storing a relationship between the plurality of biometric images and pressure indicators indicating the corresponding pressures.

According to an embodiment of the computer system, determining whether there is a match comprises: comparing the one or more texture images of the object with the one or more biometric images; and in response to a similarity between the one or more texture images of the object and the one or more biometric images being larger than a threshold, determining there is a match.

According to an embodiment of the computer system, comparing the one or more texture images of the object with the one or more biometric images comprises: quantitatively comparing one or more ridge characteristics of the one or more texture images with one or more ridge characteristics of the one or more biometric images.

According to an embodiment of the computer system, the one or more ridge characteristics comprise at least one of: width of a ridge, length of a ridge, perimeter of a circle, area of a circle, distance between two ridges, or angle of a bifurcation.

According to an embodiment of the computer system, the pressure indicators are pressures or contact areas of the texture images on a biometric reader.

According to an embodiment of the computer system, the texture data are collected at a sampling frequency from the time when the object touches a biometric reader to the time when the object leaves the biometric reader.

According to a further aspect of the present invention, there is provided a computer program product. The computer program product comprises a computer readable storage medium having program instructions embodied therewith. The program instructions are executable by a processor to cause the processor to acquire texture data of an object associated with a user and to verify the acquired texture data to authenticate the user. The texture data comprises one or more texture images of the object and one or more corresponding pressure indicators indicating pressures under which the respective texture images are collected.

According to an embodiment of the computer program product, the verifying comprises: determining whether there is a match between the one or more texture images of the object and one or more biometric images stored in a library and corresponding to the one or more pressure indicators; and in response to determining there is the match, authenticating the user to be valid.

According to an embodiment of the computer program product, the one or more biometric images are determined according to the one or more pressure indicators and a biometric data model.

According to an embodiment of the computer program product, the biometric data model is built by: acquiring a plurality of biometric images under corresponding pressures imposed by a body part on a biometric reader; and storing a relationship between the plurality of biometric images and pressure indicators indicating the corresponding pressures.

According to an embodiment of the computer program product, determining whether there is a match comprises: comparing the one or more texture images of the object with the one or more biometric images; and in response to a similarity between the one or more texture images of the object and the one or more biometric images being larger than a threshold, determining there is a match.

According to an embodiment of the computer program product, comparing the one or more texture images of the object with the one or more biometric images comprises: quantitatively comparing one or more ridge characteristics of the one or more texture images with one or more ridge characteristics of the one or more biometric images.

According to an embodiment of the computer program product, the one or more ridge characteristics comprise at least one of: width of a ridge, length of a ridge, perimeter of a circle, area of a circle, distance between two ridges, or angle of a bifurcation.

According to an embodiment of the computer program product, the pressure indicators are pressures or contact areas of the texture images on a biometric reader.

According to an embodiment of the computer program product, the texture data are collected at a sampling frequency from the time when the object touches a biometric reader to the time when the object leaves the biometric reader.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
acquiring texture data of an object to authenticate a user, wherein the texture data comprises a first texture image of the object associated with a first time and a first pressure at which the first texture image is collected and a second texture image of the object associated with a second time and a second pressure, different than the first pressure, at which the second texture image is collected;
determining a deformation in ridge characteristics between the first texture image and the second texture image corresponding to a pressure change between the first pressure and the second pressure; and
in response to the deformation matching an elastic modulus for a material not associated with the object, rejecting authentication of the user.

2. The method of claim 1, further comprising:
determining whether there is a match between one or more of the first and second texture images of the object and one or more biometric images stored in a library associated with the user; and in response to determining there is the match, authenticating the object to match the biometric images associated with the user.

3. The method of claim 2, wherein the one or more biometric images are determined according to the first pressure, the second pressure, and a biometric data model.

4. The method of claim 3, wherein the biometric data model is built by:

acquiring a plurality of biometric images under corresponding pressures imposed by a body part on a biometric reader; and storing a relationship between the plurality of biometric images and pressure indicators indicating the corresponding pressures.

5. The method of claim 1, wherein the material associated with the object is human skin.

6. The method of claim 1, wherein the ridge characteristics measured for deformation comprise at least one of: width of a ridge, length of a ridge, a distance between two ridges, and an angle of a bifurcation.

7. The method of claim 1, wherein the first pressure and the second pressure are pressures of contact areas of the first and second texture images on a biometric reader.

8. The method of claim 1, wherein the texture data are collected at a sampling frequency from the first time when the object touches a biometric reader to the second time when the object leaves the biometric reader.

9. The method of claim 2, wherein the object is authenticated to match the biometric images associated with the user and the authentication of the user is rejected based on the deformation.

10. A computer system comprising:

a processor;

a computer-readable memory coupled to the processor, the memory comprising instructions that when executed by the processor perform actions of:

acquiring texture data of an object to authenticate a user, wherein the texture data comprises a first texture image of the object associated with a first time and a first pressure at which the first texture image is collected and a second texture image of the object associated with a second time and a second pressure, different than the first pressure, at which the second texture image is collected;

determining a deformation in ridge characteristics between the first texture image and the second texture image corresponding to a pressure change between the first pressure and the second pressure; and in response to the deformation matching an elastic modulus for a material not associated with the object, rejecting authentication of the user.

11. The computer system of claim 10, further comprising: determining whether there is a match between one or more of the first and second texture images of the object and one or more biometric images stored in a library associated with the user; and in response to determining there is the match, authenticating the object to match the biometric images associated with the user.

12. The computer system of claim 11, wherein the one or more biometric images are determined according to the first pressure, the second pressure, and a biometric data model.

13. The computer system of claim 12, wherein the biometric data model is built by:

acquiring a plurality of biometric images under corresponding pressures imposed by a body part on a biometric reader; and storing a relationship between the plurality of biometric images and pressure indicators indicating the corresponding pressures.

14. The computer system of claim 10, wherein the material associated with the object is human skin.

15. The computer system of claim 12, wherein the object is authenticated to match the biometric images associated with the user and the authentication of the user is rejected based on the deformation.

16. A computer program product, comprising a computer readable storage medium having program instructions embodied therewith, the program instructions being executable by a processor to cause the processor to:

acquire texture data of an object to authenticate a user, wherein the texture data comprises a first texture image of the object associated with a first time and a first pressure at which the first texture image is collected and a second texture image of the object associated with a second time and a second pressure, different than the first pressure, at which the second texture image is collected;

determine a deformation in ridge characteristics between the first texture image and the second texture image corresponding to a pressure change between the first pressure and the second pressure; and in response to the deformation matching an elastic modulus for a material not associated with the object, reject authentication of the user.

17. The computer program product of claim 16, wherein the program instructions executable by the processor to cause the processor to verify the acquired texture data comprise program instructions executable by the processor to cause the processor to:

determine whether there is a match between one or more of the first and second texture images of the object and one or more biometric images stored in a library associated with the user; and in response to determining there is the match, authenticate the object to match the biometric images associated with the user.

18. The computer program product of claim 17, wherein the one or more biometric images are determined according to the first pressure, the second pressure, and a biometric data model.

19. The computer program product of claim 16, wherein the material associated with the object is human skin.

20. The computer program product of claim 17, wherein the object is authenticated to match the biometric images associated with the user and the authentication of the user is rejected based on the deformation.

* * * * *